J. P. CLIFFORD & S. G. MURRAY.
WEIGHING MACHINE.
APPLICATION FILED JAN. 10, 1912.

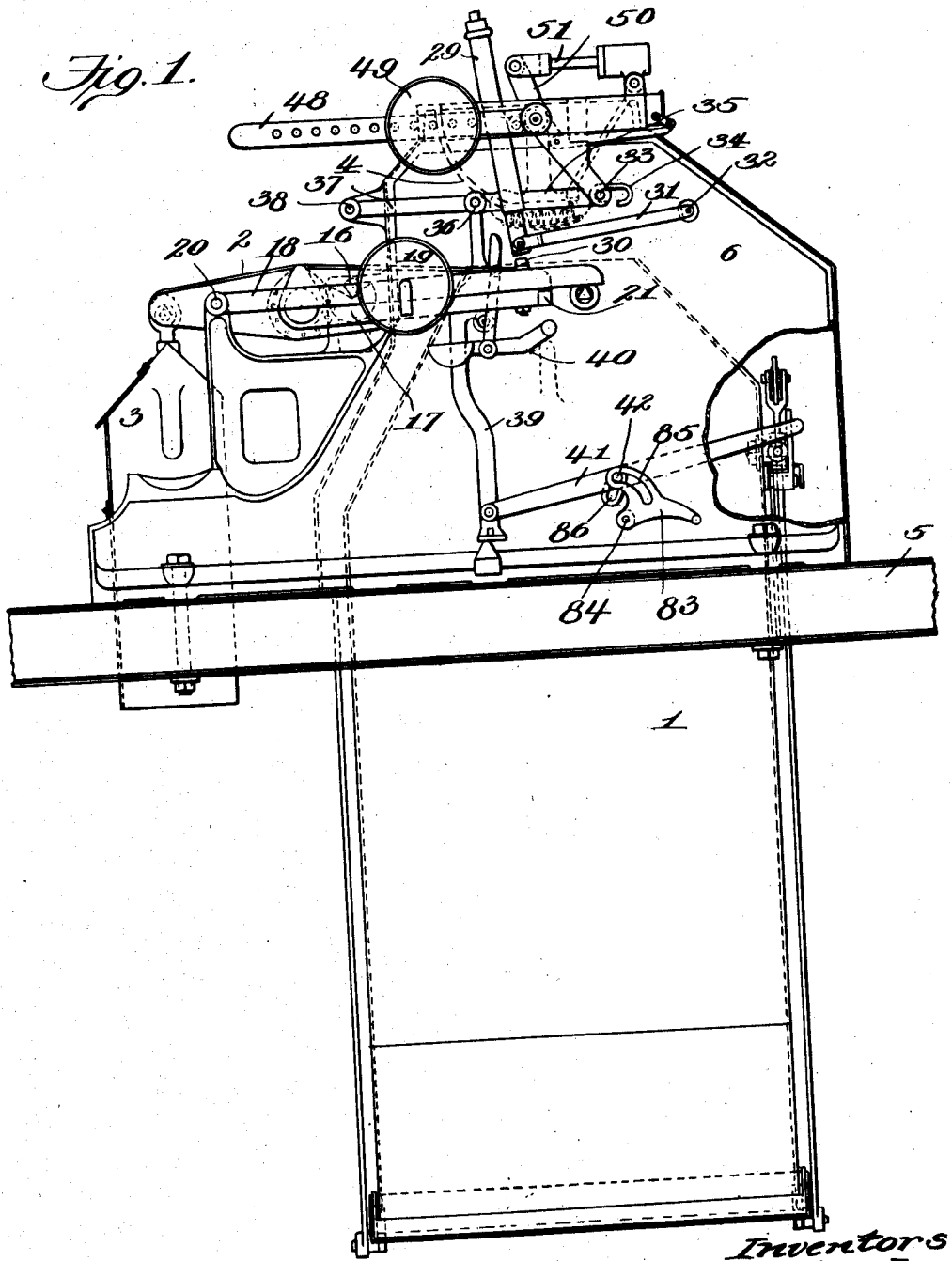

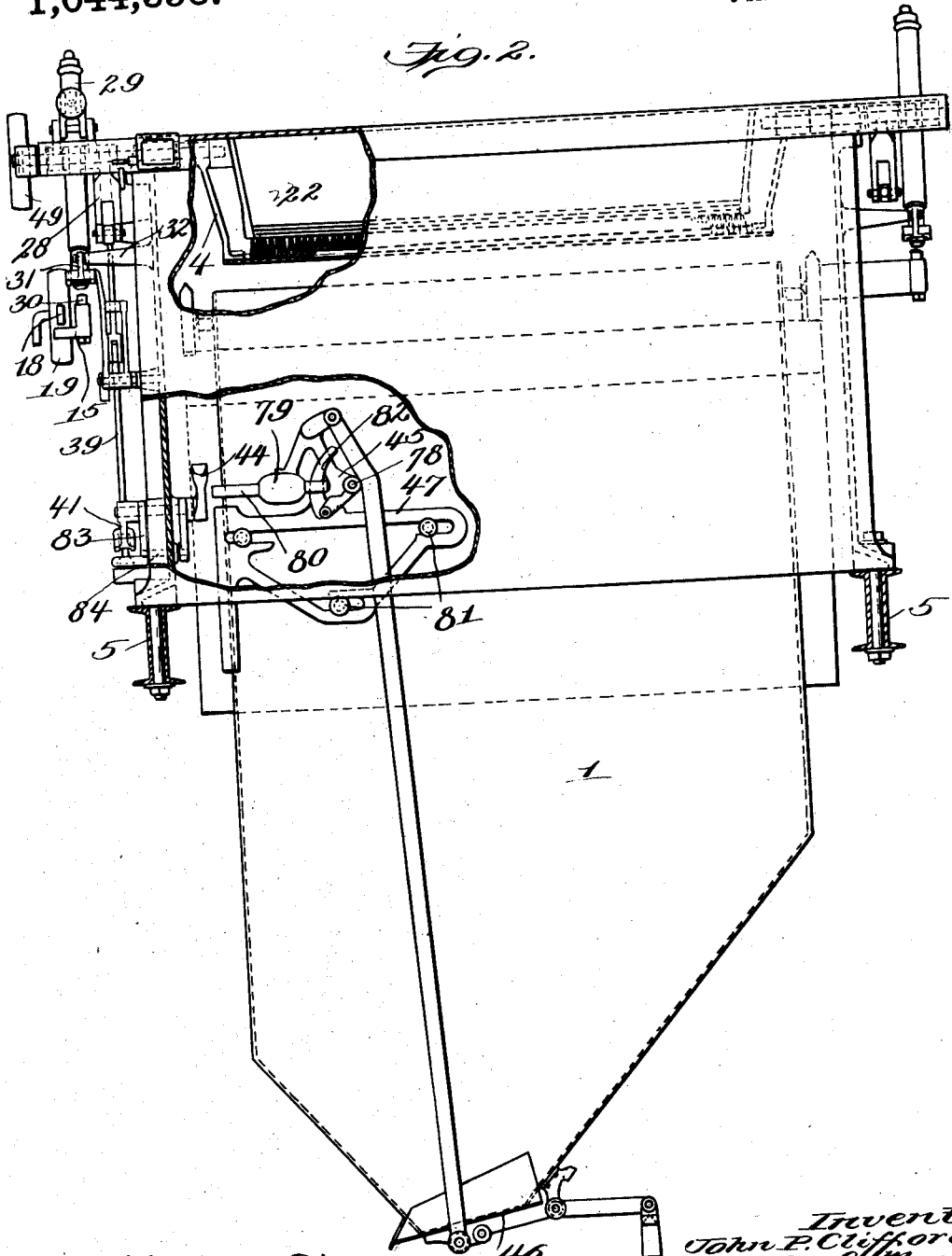

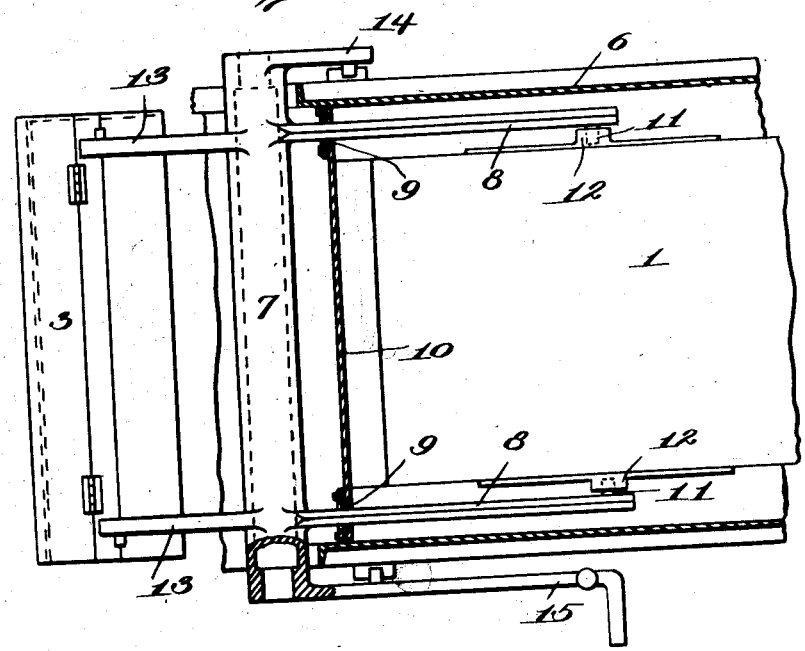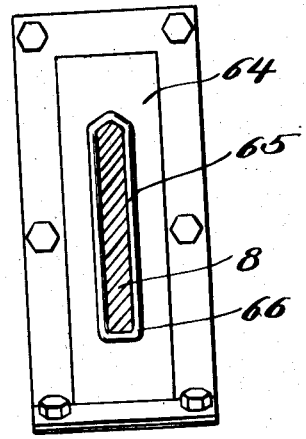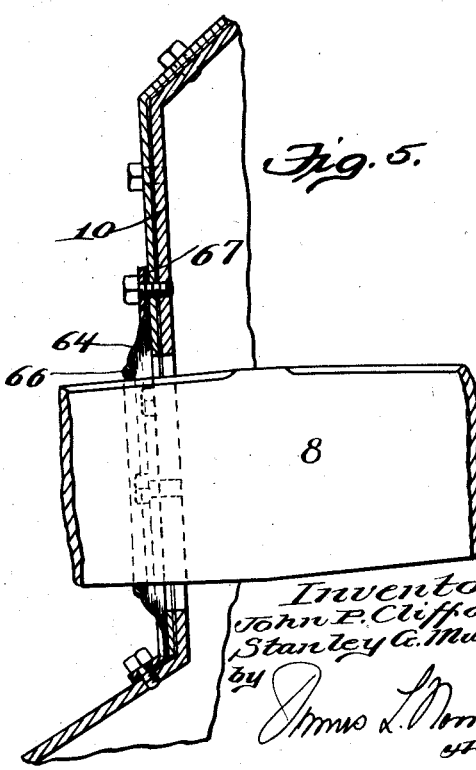

1,044,353.

Patented Nov. 12, 1912.
5 SHEETS—SHEET 4.

Witnesses:

Inventors
John P. Clifford
Stanley G. Murray

J. P. CLIFFORD & S. G. MURRAY.
WEIGHING MACHINE.
APPLICATION FILED JAN. 10, 1912.

1,044,353.

Patented Nov. 12, 1912.
5 SHEETS—SHEET 5.

Witnesses:

Inventors
John P. Clifford
Stanley G. Murray

UNITED STATES PATENT OFFICE.

JOHN P. CLIFFORD AND STANLEY G. MURRAY, OF PASSAIC, NEW JERSEY, ASSIGNORS TO RICHARDSON SCALE COMPANY, OF ATHENIA, NEW JERSEY, A CORPORATION OF NEW JERSEY.

WEIGHING-MACHINE.

1,044,353.  Specification of Letters Patent.  Patented Nov. 12, 1912.

Application filed January 10, 1912. Serial No. 670,461.

*To all whom it may concern:*

Be it known that we, JOHN P. CLIFFORD and STANLEY G. MURRAY, citizens of the United States, residing at Passaic, in the county of Passaic and State of New Jersey, have invented new and useful Improvements in Weighing-Machines, of which the following is a specification.

The present invention relates to improvements in weighing machines and more especially to those adapted or used for the handling of pulverulent or dusty materials, and the primary object of the invention is to provide improvements for such weighing machines whereby all dust or free-flying materials are confined to the interior of the weighing machine and accuracy in the operation thereof is insured, the principal operative parts of the machine being mounted exteriorly of the casing which incloses the machine, thereby avoiding accumulation of the dusty and damp material thereon, and improved mountings and operating connections are provided for the feed or cut-off gate, the weigh beam, and the load-tripping lever or member.

Further objects of the invention are to provide a weigh beam of improved construction, a hopper door frame of great rigidity and strength, a cushion for absorbing or minimizing the shock incident to the opening of the feed or cut-off gate, and an adjustment for varying the amount of power applied to the feed or cut-off gate to close it.

To these and other ends, the invention consists in certain improvements, and combinations and arrangements of parts, all as will be hereinafter more fully described, the novel features being pointed out particularly in the claims at the end of the specification.

Figure 6:
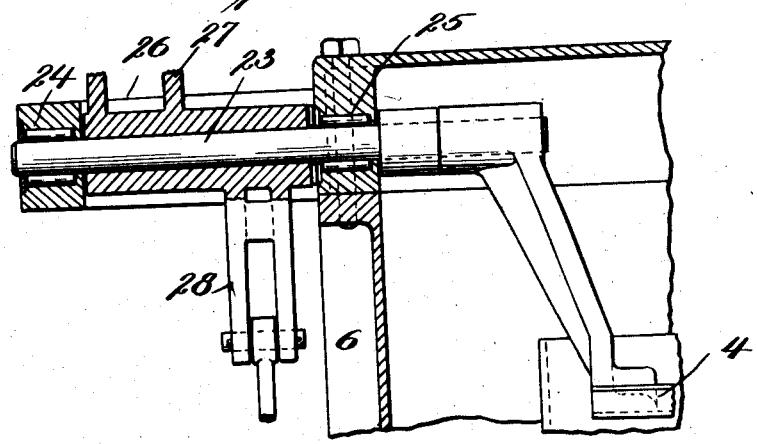
Figure 7:
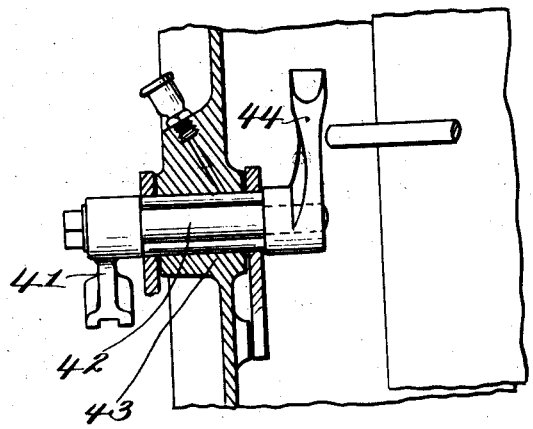
Figure 8:
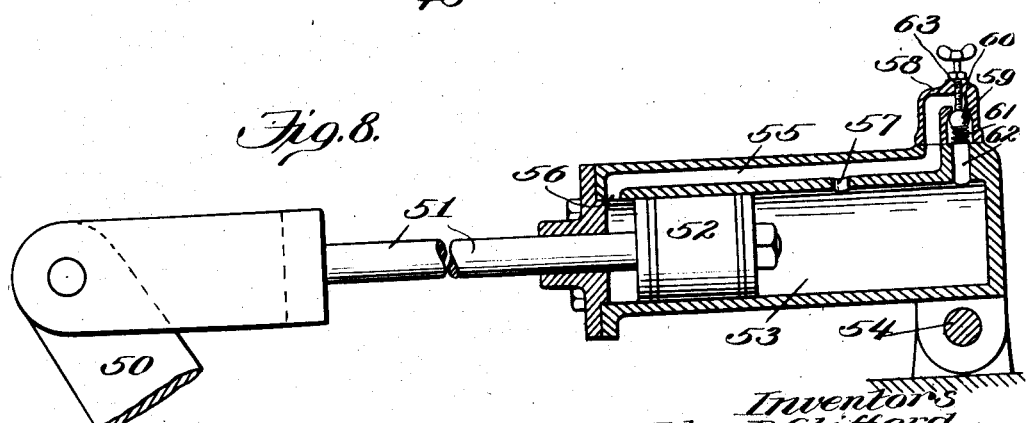
Figure 9:
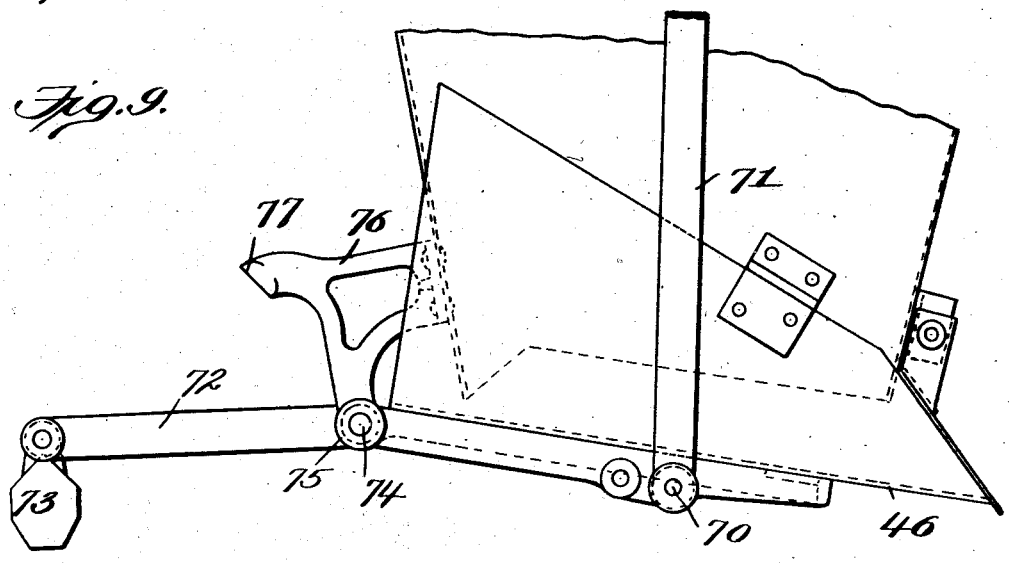
Figure 10:
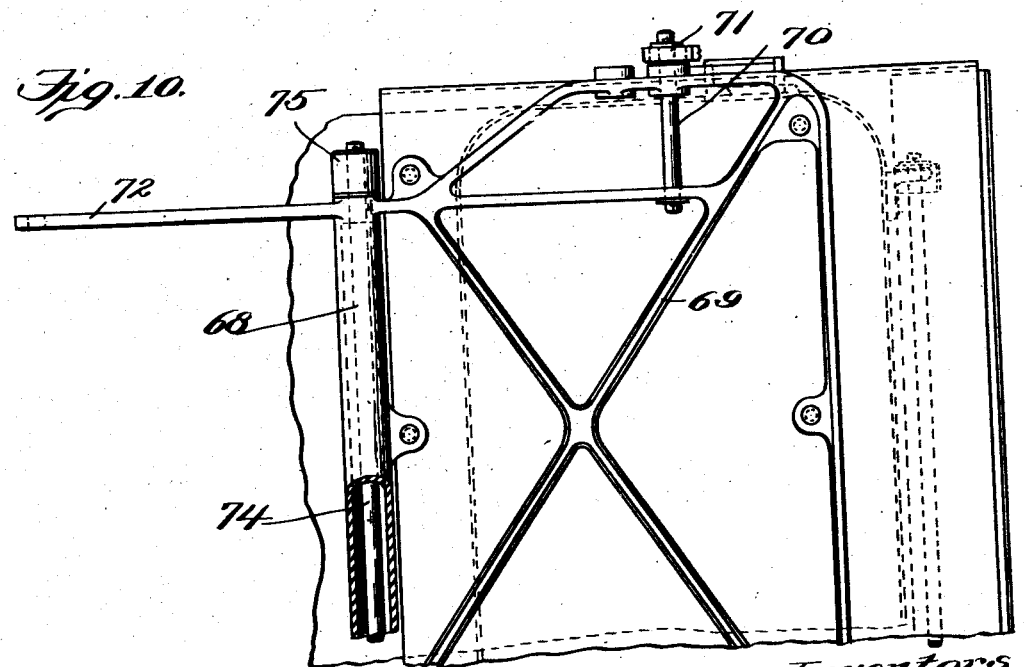

In the accompanying drawings:—Figure 1 is a side elevation of an automatic weighing machine constructed in accordance with the present invention; Fig. 2 is an end elevation partly in section of the machine as shown in Fig. 1 and as viewed from the right thereof; Fig. 3 is a top plan view of the weigh beam, the counterpoise, and a portion of the hopper, parts of the structure in this figure being shown in section; Figs. 4 and 5 are detail sectional views showing a device for preventing escape of dust or pulverulent material through the casing at the point where the weigh beam passes therethrough; Fig. 6 is a detail sectional view of a portion of the casing and one of the shafts of the feed or cut-off gate; Fig. 7 is a detail sectional view of a portion of the casing showing the mounting for the load-discharging lever or member; Fig. 8 is a detail view partly in section of the cushion for absorbing or minimizing shock incident to the opening of the feed or cut-off gate; Fig. 9 is a side elevation of the lower portion of the weigh hopper showing a hopper door applied thereto having a reinforced frame embodying the present invention; and Fig. 10 is a bottom plan view of a portion of the weigh hopper and the discharge gate showing the reinforced stiffening frame.

Similar parts are designated by the same reference characters in the several views.

The present improvements are applicable generally to weighing machines of various types. For convenience, these improvements have been shown in the present instance in connection with automatic weighing machines of the general type disclosed in prior U. S. patents granted to Henry Richardson, Nos. 760,485 and 960,108, such modifications, however, having been made to adapt the present improvements to machines of that class.

In the present instance, the weighing machine embodies a weigh hopper 1, a weigh beam 2 supporting the weigh hopper at one end and having the counterpoise 3 suspended from its opposite end, and a feed or cut-off valve 4 for controlling the supply of material to the weigh hopper to perform each weighing operation. Suitable supports are provided for the machine, a pair of longitudinal beams 5 being provided at opposite sides of the machine in the present instance and these supports are usually located at the floor level.

According to the present invention, the upper portion of the weighing machine is inclosed by a casing 6 which rests upon the supports 5 and serves to effectively confine all dust or powdery material that may rise incident to the flow of the material from the feed chute through the feed or cut-off valve and into the weigh hopper. The side members of the casing 6 are composed of castings or other relatively strong and rigid construction as these side members of the casing constitute the supports not only for the weight of the machine but also the operative parts thereof the relation of which must be maintained to insure durability and accuracy.

The weigh beam 2 in the present instance is of improved construction, it embodying a hollow and rigid cross member 7 having a pair of arms 8 which are formed integrally therewith and project through openings 9 in the rear wall 10 of the casing and are provided with knife edges 11 which coöperate with bearings 12 on opposite sides of the weigh hopper and thereby support the latter, and a pair of relatively shorter arms 13 proceed as integral extensions from the opposite side of the hollow cross member 7 of the beam and support the counterpoise 3. One end of the hollow cross member 7 of the weigh beam is formed with a relatively short arm 14 which projects laterally beyond the adjacent side member of the casing 6 and has a knife edge bearing on the respective side member of the casing, while the opposite end of the hollow cross member 7 of the weigh beam has a relatively longer arm 15 which is provided with a knife edge 16 resting on a knife edge bearing 17 supported by the opposite side member of the casing, the two knife edge bearings for the beam being wholly exterior of the casing. This arm 15 of the weigh beam is also located exteriorly of the casing and is utilized in the present instance to operate the feed or cut-off gate. 18 is a lever having a weight 19 adjustable or slidable longitudinally thereon, the lever having a pivotal bearing at 20 on a relatively fixed part of the adjacent side member of the casing while the opposite end of the lever has a knife edge bearing on a projection 21 carried by the arm 15 of the weigh beam, this lever and weight serving to compensate for the weight of the column of material falling after the feed or cut-off gate has closed owing to settling of the weigh hopper. The feed or cut-off gate 4 coöperates with the bottom 22 of the supply chute or hopper, this gate 4 being of segmental form and having its ends supported by shafts 23. Each of these shafts is journaled in a pair of bearings 24 and 25, these bearings being preferably of the roller or anti-friction type, the bearing 25 being formed in the respective side member of the casing and the bearing 24 is rigidly supported in alinement with the bearing 25 by a rigid or integral arm 26. The shaft 23 at the front of the machine has a pair of cranks 27 and 28 fixed thereto, the crank 27 being pivotally connected to the gate opening pendant 29, and the lower end of this pendant is adapted to be engaged and lifted by a projection 30 borne by the arm 15 of the weigh beam, the lower end of the pendant being held in proper position to engage the projection 30, by a link 31 which is pivotally connected at 32 to the adjacent side member of the casing. The crank 28 is provided with a pin 33 which operates loosely in an elongated eye 34 formed on the outer end of a toggle link 35, the inner end of this link being pivotally connected at 36 to a second toggle link 37 which is pivotally connected at 38 to a relatively fixed part of the adjacent side member of the casing, and the intermediate pivot 36 connecting the links 35 and 37 has a drop bar 39 connected thereto, operation of the drop bar and the toggle links being controlled by a trigger 40, and the lower end of the drop bar is pivotally connected to a load-discharging lever or member which in the present instance comprises an arm 41 which is arranged exteriorly of the respective side member of the casing and is rigidly fixed to a shaft 42 which extends through the casing and has a suitable bearing therein, a roller bearing 43 being provided for this shaft in the present instance. An arm 44 is arranged within the respective side member of the casing and is rigidly fixed to the inner end of the shaft 42, this inner arm 44 being arranged in coöperative relation with the locking toggle 45 which controls the opening of the hopper discharge door 46, and the interlocking member 47 which prevents opening of the feed or cut-off gate while the hopper door is in open position. The mode of operation of the pendant or opening in the feed or cut-off gate, the toggle, pendant, trigger, and load-discharging devices is fully described in the prior patents above referred to and reference thereto is unnecessary.

The present invention, however, provides means for varying the amount of power acting to close the cut-off gate, the shaft 23 at the front of the machine being provided with a radial lever 48 and a weight 49 which is slidable or otherwise adjustable longitudinally on this lever, the distance of the weight from the shaft or axis of rotation of the feed valve determining the amount of power applied thereto to close it. The present invention also provides a cushion for absorbing or minimizing the shock incident to the opening of the feed or cut-off gate preliminary to each weighing operation, the shaft 23 at the forward side of the machine being provided with a crank arm 50 which is operatively connected to a reciprocatory plunger 51, the latter having a piston head 52 which operates axially within the cylinder 53, the latter being pivotally connected by the pin 54 to the respective side member of the casing. The casing of the cylinder 53 is formed with a by-passage 55 having a port 56 which leads into the forward end of the cylinder and a port 57 which leads into the cylinder at a point intermediate its length. A valve casing 58 is also provided toward the rear end of the cylinder casing, this valve casing having a valve seat 59, a coöperative valve 60 preferably in the form of a ball, and a spring 61 which operates to press the valve toward its seat. An extension of the passage 55 leads to the upper side of the valve seat 59 and a port 62 leads from the under side of the valve seat 59 to the rear end of the cylinder. A screw 63 extends through the valve casing and operates upon the valve 60 to regulate the distance of the valve with respect to its seat. The piston 52 is free to reciprocate in that portion of the cylinder between the ports 56 and 57. However, during opening movement of the valve, the piston head 52 will move toward the right in Fig. 8 and toward the end of the opening movement of the valve, the piston head 52 will pass the port 57. Continued movement of the piston head toward the right in Fig. 8 will cause the fluid trapped in the rear end of the cylinder to be wiredrawn through the space between the valve seat 59 and the valve 60, the opening movement of the feed valve being thereby retarded and gradually arrested.

In order to prevent the escape of dust or powdery material through the openings 9 which accommodate the movable arms 8 of the weigh beam, the rear wall 10 of the casing is provided with a relatively delicate diaphragm of flexible rubber or other material. This diaphragm 64 in the present instance has an opening 65 to receive the corresponding arm 8 of the weigh beam and preferably this opening in the diaphragm is surrounded by a bead 66 which will prevent splitting of the rubber diaphragm. The diaphragm is clamped in position by a ring or frame 67 which is bolted or otherwise secured to the rear wall 10 of the casing.

The door 46 at the bottom of the weigh hopper 1 controls the dumping or discharge of the load therefrom after each weighing operation has been completed. The present invention provides an improved frame for this hopper door which is of great rigidity and is capable of preventing distortion of the door because of the strain imposed thereon. This frame as shown in Figs. 9 and 10 comprises a hollow or tubular cross member or sleeve 68 having a framework 69 which is preferably formed integrally therewith, and the hopper door is secured to the upper side of this framework. The framework at one side is provided with a pin 70 the outer end of which coöperates with an upwardly extending locking bar 71. A pair of rigid arms 72 proceed from the opposite side of the hollow or tubular sleeve or cross member 68 and support a counterpoise 73, the latter acting with sufficient power to close the hopper door immediately after the charge of material has been dumped from the weigh hopper. The pivot rod or pintle 74 extends through the sleeve or tubular cross member 68 and the opposite ends of the pintle are mounted in supporting lugs 75 borne by brackets 76, the latter being rigidly bolted or secured to the lower portion of the weigh hopper. Each of these brackets also has a stop shoulder 77 which limits the extent of opening movement of the hopper door. The bar 71 controls the opening of the hopper discharge door, this bar being provided with suitable means for locking it in such a position as to retain the hopper door in closed position. The toggle 45 is employed for this purpose. In the present instance, it is pivoted to a vertical wall of the weigh hopper at 78 and carries a weight 79 which normally holds the toggle in locked position. The toggle also has an arm 80 which is arranged to be lifted by the load-discharging arm 44, whereby the toggle will be unlocked and the weight of the load in the weigh hopper will open the hopper door. The interlocking member 47 which is shiftable laterally on the guiding pins 81 and is operated by the cam 82 connected to the top of the toggle serves to prevent opening of the feed or cut-off gate until after the discharge door of the weigh hopper has been closed, this arrangement preventing unweighed material from passing through the weighing machine.

In the machine as shown, the various cycles of operations will take place automatically and after each weighing operation has been completed and the weighed charge has been dumped, the next weighing operation will commence. However, in some instances, it may be desirable or necessary to interrupt the operation of the weighing machine, and to enable this to be accomplished with facility, a stop device has been provided, it comprising a member 83 which is pivoted to the forward side member of the casing at 84 and has a spiral cam slot 85 which coöperates with the shaft 42 of the load-discharging member, this shaft 42 in this instance operating in an elongated bearing or slot 86 and by rotating the member 83 on its pivot, the shaft 42 may be elevated to operative position or lowered to an inoperative position and while the shaft 42 is in its lowered or inoperative position, the load-releasing arm 44 will not rise sufficiently to trip the toggle 45, the dumping of the weighed charge being thereby avoided.

We claim as our invention:—

1. In weighing machines, the combination of a weigh hopper, means embodying a cut-off gate for supplying material thereto, a casing inclosing the upper portion of the weigh hopper and the cut-off gate, and a weigh beam having supporting bearings located exteriorly of said casing and arms extending into the casing and supporting the weigh hopper.

2. In weighing machines, the combination of a weigh hopper, means embodying a cut-off gate for supplying material thereto, a casing embodying a pair of rigid side members, the casing inclosing the upper portion of the weigh hopper and the cut-off gate, and a weigh beam having bearings arranged exteriorly of the casing and borne by the rigid side members thereof, the weigh beam being operatively connected to the weigh hopper within the casing.

3. In weighing machines, the combination of a weigh hopper, a cut-off gate for supplying material thereto, a casing inclosing the upper portion of the weigh hopper and the cut-off gate and provided with openings, a weigh beam having bearings exteriorly of said casing and having arms extending through said openings in the casing and supporting the weigh hopper, and means for preventing escape of material from the interior of the casing through the openings through which the arms of the weigh hopper extend.

4. In weighing machines, the combination of a weigh hopper, a cut-off gate for supplying material thereto, a casing inclosing the upper portion of the weigh hopper and said cut-off gate and provided with openings, a weigh beam having bearings located exteriorly of the casing and having arms extending through said openings in the casing and supporting the weigh hopper therein, and a flexible diaphragm for each of said openings, said diaphragm being secured to the casing and surrounding the respective arm of the weigh beam to permit movements of the latter and prevent escape of material through such openings.

5. In a weighing machine, the combination of a weigh hopper, a cut-off gate for supplying material thereto, a casing inclosing the upper portion of the weigh hopper and said gate, a weigh beam having bearings located exteriorly of the casing, said beam also bearing an exterior arm, and means also located exteriorly of the casing for controlling said gate by said arm of the weigh beam.

6. In weighing machines, the combination of a weigh hopper, a cut-off gate for controlling the supply of material thereto, a casing inclosing the upper portion of the weigh hopper and said gate, a weigh beam having an arm located exteriorly of the casing, means located exteriorly of the casing and coöperative with said arm of the beam for opening the gate, and means also located exteriorly of the casing and coöperative with said arm of the weigh beam for controlling the closing of said gate.

7. In a weighing machine, the combination of a weigh hopper, a casing inclosing the upper portion thereof, a weigh beam supporting said hopper, a cut-off gate for controlling the supply of material to the weigh hopper, said gate having shafts and the casing having bearings through which said shafts extend, one of said shafts extending to the exterior of the casing, and means located exteriorly of the casing for controlling the operation of said gate.

8. In a weighing machine, the combination of a weigh hopper, a weigh beam supporting the same, a cut-off gate for controlling the supply of material to the weigh hopper, a casing inclosing the upper portion of the weigh hopper and said gate, said casing embodying a rigid side member, bearings on said side member of the casing and exteriorly of the latter for supporting the weigh beam, mechanism also exteriorly of the casing for controlling operation of said gate, and load-discharging mechanism supported by said rigid side member of the casing.

9. In a weighing machine, the combination of a weigh hopper having a discharge door and means for locking the latter in closed position, a gate for controlling the supply of material to the weigh hopper, a weigh beam supporting the hopper, a casing embodying a rigid side member inclosing the upper portion of the hopper and said gate, and means controlled by the weigh beam for unlocking the hopper discharge door, such means comprising a pair of arms located interiorly and exteriorly respectively of the casing, and a shaft journaled in the rigid side member of the casing and connecting said arms.

10. In a weighing machine, the combination of a weigh hopper having a load-discharging door and means for locking the latter in closed position, a gate for controlling the supply of material to the hopper, a weigh beam supporting the hopper, means controlled by the weigh beam for unlocking the hopper discharge door embodying a pivoted member, and a stop device for interrupting the operation of the weighing machine, said device being operative to shift the axis of said member and thereby prevent unlocking of the hopper discharge door.

11. In a weighing machine, the combination of a weigh hopper, a gate for controlling the supply of material thereto, and a weigh beam comprising a tubular cross member, a pair of arms proceeding from one side thereof, bearings supporting said arms, a second pair of arms proceeding from the same side of said cross member and supporting the weigh hopper, and another pair of arms proceeding from the opposite side of said cross member and supporting a counterpoise.

12. In a weighing machine, the combination of a weigh hopper, a gate for controlling the supply of material thereto, a casing including rigid side members inclosing the upper portion of said hopper and the gate, and a weigh beam comprising a rigid cross member having a pair of arms proceeding from one side thereof, bearings on the exterior sides of the side members of the casing and coöperative as supports with said arms of the weigh beam, a second pair of arms proceeding from the same side of said cross member of the weigh beam and into the casing to support the weigh hopper, and arms proceeding from the opposite side of the cross member of the weigh beam and supporting a counterpoise.

13. In a weighing machine, the combination of a weigh hopper, a weigh beam supporting the same, a gate for controlling the supply of material to the weigh hopper, means for opening said gate, and a cushion for absorbing or minimizing shock incident to the opening movement of said gate and inoperative during closing movement thereof.

14. In a weighing machine the combination of a weigh hopper, a weigh beam supporting the same, a gate for controlling the supply of material to the weigh hopper, and a fluid-controlled cushion operatively connected to the gate for absorbing shock incident to the opening thereof and inoperative during closing of the gate.

15. In a weighing machine, the combination of a weigh hopper, a weigh beam supporting the same, a pivoted gate controlling the supply of material to the weigh hopper, a lever fixed to turn with the gate, a weight adjustable radially on said lever for varying the amount of power applied to close the gate, and a cushioning device operative during opening movement of the gate and inoperative during closing thereof.

In testimony whereof we have hereunto set our hands in presence of two subscribing witnesses.
JOHN P. CLIFFORD.
STANLEY G. MURRAY.

Witnesses:
JACOB VAN DORN,
RANDOLPH C. FARRAR.